(12) United States Patent
Sarukkai

(10) Patent No.: US 6,571,288 B1
(45) Date of Patent: May 27, 2003

(54) APPARATUS AND METHOD THAT EMPIRICALLY MEASURES CAPACITY OF MULTIPLE SERVERS AND FORWARDS RELATIVE WEIGHTS TO LOAD BALANCER

(75) Inventor: Sekhar R. Sarukkai, Sunnyvale, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/299,323

(22) Filed: Apr. 26, 1999

(51) Int. Cl.[7] .................................................. G06F 15/173
(52) U.S. Cl. ........................................ 709/226; 709/224
(58) Field of Search ................................. 709/224, 223, 709/226; 370/252; 714/46

(56) References Cited

U.S. PATENT DOCUMENTS

| | | | | |
|---|---|---|---|---|
| 5,459,837 A | * | 10/1995 | Caccavale | 709/226 |
| 5,608,866 A | * | 3/1997 | Horikawa | 714/39 |
| 5,668,951 A | * | 9/1997 | Jain et al. | 709/235 |
| 5,694,602 A | * | 12/1997 | Smith | 709/105 |
| 5,704,012 A | * | 12/1997 | Bigus | 706/19 |
| 5,740,371 A | * | 4/1998 | Wallis | 709/229 |
| 5,761,411 A | * | 6/1998 | Teague et al. | 714/42 |
| 5,768,520 A | * | 6/1998 | Dan et al. | 709/223 |
| 5,774,668 A | * | 6/1998 | Choquier et al. | 709/223 |
| 5,796,633 A | * | 8/1998 | Burgess et al. | 702/187 |
| 5,828,847 A | * | 10/1998 | Gehr et al. | 709/239 |
| 5,884,038 A | * | 3/1999 | Kapoor | 709/226 |
| 5,889,955 A | * | 3/1999 | Shinozaki et al. | 709/224 |
| 5,937,165 A | * | 8/1999 | Schwaller et al. | 709/224 |
| 5,956,662 A | * | 9/1999 | Hemker et al. | 702/182 |
| 6,061,722 A | * | 5/2000 | Lipa et al. | 709/224 |
| 6,112,239 A | * | 8/2000 | Kenner et al. | 709/224 |
| 6,157,618 A | * | 12/2000 | Boss et al. | 370/252 |
| 6,173,322 B1 | * | 1/2001 | Hu | 709/224 |
| 6,185,601 B1 | * | 2/2001 | Wolff | 709/203 |
| 6,249,800 B1 | * | 6/2001 | Aman et al. | 709/105 |
| 6,259,705 B1 | * | 7/2001 | Takahashi et al. | 370/465 |
| 6,269,401 B1 | * | 7/2001 | Fletcher et al. | 709/224 |
| 6,279,001 B1 | * | 8/2001 | DeBettencourt et al. | 707/10 |
| 6,286,046 B1 | * | 9/2001 | Bryant | 709/224 |
| 6,314,463 B1 | * | 11/2001 | Abbott et al. | 709/224 |
| 6,314,465 B1 | * | 11/2001 | Paul et al. | 709/226 |
| 6,393,455 B1 | * | 5/2002 | Eilert et al. | 709/104 |
| 6,408,335 B1 | * | 6/2002 | Schwaller et al. | 709/224 |
| 6,438,592 B1 | * | 8/2002 | Killian | 709/224 |

OTHER PUBLICATIONS

Mittal et al., Scatter–Brian:Aa Experimnent in Distributed Problem Solving applied to Load Balancing, IEEE, 1989pp. 760–766.*

Rabinovich et al., RaDaR: A Scalable Architecture for a Global Web Hosting Service, decweb.ethz.ch/www8/data/2169/html, 31 page.*

Wybranietz et al., "Monitoring and Perfromance Measuring Distributed Systems During Operation", 1988 ACM, pp. 197–206.*

(List continued on next page.)

Primary Examiner—Bunjob Jaroenchonwanit

(57) ABSTRACT

A system for and a method of empirically measuring the capacity of multiple servers in a cluster including at least one capacity prober for measuring the load capacity of each server and for forwarding the relative weights to a load balancer for the cluster. During off peak operating hours, one at a time each server in the cluster is taken off line and stress tested to measure the capacity of the server. The remaining servers in the cluster remain on line to service customers. The relative weights for each of the servers are collected and updated in the load balancer. In this way, the operation of the cluster is better optimized.

11 Claims, 3 Drawing Sheets

OTHER PUBLICATIONS

Ware et al., "Automatic Modeling of File System Workloads Using Two–Level Arrival Processes", Jul. 1998, ACM Transactions on Modeling and Computer Simulation, vol. 8, No. 3, pp. 305–330.*

Korhonen et al., "Parallel Processor Trigger with Distributed Real–Time Kernel", 1991, IEEE, pp. 486–490.*

Eom et al., "LBF: A Performance Metric for Program Reorganization", 1998, IEEE, 8 pages.*

Russ et al., "Hectiling: An Integration of Fine and Coarse–Grained Load–Balancing Strategies", 1998, IEEE, 8 pages.*

Dorland et al., "Implementing MM5 on NASA Goddard Space Flight Center Computing Systems: a Performance Study", Feb. 1999, IEEE 8 pages.*

Nevison, "Restructuring Networks to Avoid Deadlocks in Parallel Simulations", 1990, Proceedings of the 1990 Winter Simulatio Conference, pp. 446–452.*

Zafirovic et al., "Waiting Time Estimates in Symmetric ATM–Oriented Rings with the Destination Release of Used Slots", 1999, IEEE, pp. 251–261.*

* cited by examiner

APPARATUS AND METHOD THAT EMPIRICALLY MEASURES CAPACITY OF MULTIPLE SERVERS AND FORWARDS RELATIVE WEIGHTS TO LOAD BALANCER

BACKGROUND OF THE INVENTION

1. Field of Invention

The present invention relates generally to the field of network server clusters and pertains more particularly to a system for and a method of empirically measuring the capacity of multiple servers in a cluster and forwarding the relative weights for each server to a load balancer for the cluster.

2. Discussion of the Prior Art

Since at least as early as the invention of the first computer system, people have endeavored to link computers together. Linking computers together in a network allows direct communication between the various points of the network and sharing of resources, such as servers, among the points of the network. This was especially desirable early on because computers were very large and very expensive. Today, computers are far more prevalent, but the desire to link them together is still strong. This is most readily demonstrated by the explosive growth of the Internet.

Servers are commonly employed for sharing of information among large numbers of computer systems or similar devices. A computer system that communicates with a server is usually referred to as a client of the server and the server is often part of a host system. A client and a host typically exchange messages via a communication network using a predetermined protocol. Such protocols are usually arranged in a client/host model in which a requesting client transfers a request message to a host and the host in turn takes an appropriate action depending on the content of the request message. Typically, the appropriate action for the request message includes the transfer of a response message to the requesting client.

Current protocols typically do not allow for the establishment of a persistent session between the client and the host in the traditional sense in which a local terminal establishes a session on a computer system. Instead, any session-like information is usually implied in the content of the messages exchanged between the client and the host. Such a communication protocol may be referred to as a "stateless" protocol. Such stateless protocols include protocols associated with Internet communication including the Internet Protocol (IP), the User Datagram Protocol (UDP), the Simple Mail Transfer Protocol (SMTP), and the Hypertext Transfer Protocol (HTTP), as well as the Network File System (NFS) Protocol.

A client that accesses a host commonly engages in an extended transaction with the host. Such an extended transaction typically involves the exchange of multiple messages between the client and the host. For example, an NFS client typically issues multiple request messages to an NFS server while retrieving a file from the NFS server. Similarly, an HTTP client typically issues multiple request messages to an HTTP server while browsing through web pages contained on the HTTP server. Such transactions that involve the exchange of multiple messages between a client and a server are hereinafter referred to as sessions.

Servers commonly have a large pool of potential clients which may issue request messages. For example, an HTTP server connected to the world-wide-web has potentially millions of clients from which it may receive request messages. Current servers that are adapted for stateless protocols typically respond to each request message in the order in which it is received, that is, on a first-come-first-served basis regardless of the source of the request message.

In the present context, the term "quality of service" refers both a host's ability to provide quick response to a message and to complete an entire session. As a particular host becomes more popular, and due to that popularity receives more messages, the processing resources of the host can become stretched. For example, due to heavy traffic, a host may not be able to respond to a message at all, or the host may not provide a timely response which can cause a client to "time-out" and generate an error. Poor quality of service can have significant results, as users may become frustrated and simply give up trying to reach a particular host, or the sponsor of the host may lose sales or fail to communicate needed information to any or all clients.

One technique that is generally used to alleviate quality of service problems is to add more processing capacity to the host. This can be done typically by either replacing the host with another, more powerful computer, or by providing multiple computers in parallel as a server cluster and delegating new messages to different ones of the multiple servers. When multiple servers are used in a cluster a load balancer is used to allocate the demand to the various servers. Demand is allocated by assigning each server a value called a relative weight. The relative weight determines what proportion of the traffic each server in the cluster carries. Generally, it is the case that the higher the relative weight then the higher the load. When the cluster is made up of identical servers, then the relative weights are typically equal to one another. This is because the servers should theoretically be able to handle equal loads.

When the cluster is made up of different servers, then the situation becomes more complicated. The use of a heterogeneous cluster of servers is common because demand on the host grows over time. The problem is that, when one goes to add a server to the cluster, the state of the art in computers has changed. Either one can no longer get the same computer as before or one chooses not to. Few can afford to replace the entire cluster just to add one new computer. The result is that different servers are used. The complication lies in determining what relative weights to assign the servers in the cluster. Conventionally, two techniques have been used. First, the servers are theoretically modeled based on design parameters and the relative weights are calculated based on the models. Second, the relative weights are determined based on ad hoc cluster operation. This means that the relative weights are set to an initial value and the cluster is put into operation. Later, if and when the operator of the cluster notices that a problem exists, then the relative weights are adjusted based on an educated guess of what would help to alleviate the problem. Neither technique is ideal.

A definite need exists for a system having an ability to empirically measure the capacity of multiple servers and forward the relative weights to the load balancer. In particular, a need exists for a system which is capable of performing a capacity test on each server in the cluster. Ideally, such a system would operate by measuring a server's load capacity and assigning a relative weight accordingly. With a system of this type, load balancing would provide a reliable means of fairly sharing network resources. A primary purpose of the present invention is to solve this need and provide further, related advantages.

SUMMARY OF THE INVENTION

A system for and a method of empirically measuring the capacity of multiple servers in a cluster is disclosed including at least one capacity prober for measuring the load capacity of each server and for forwarding the relative weights to a load balancer for the cluster. During off peak operating hours, one at a time each server in the cluster is taken off line and stress tested to measure the capacity of the server. The remaining servers in the cluster remain on line to service customers. The relative weights for each of the servers are collected and updated in the load balancer. In this way, the operation of the cluster is better optimized.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
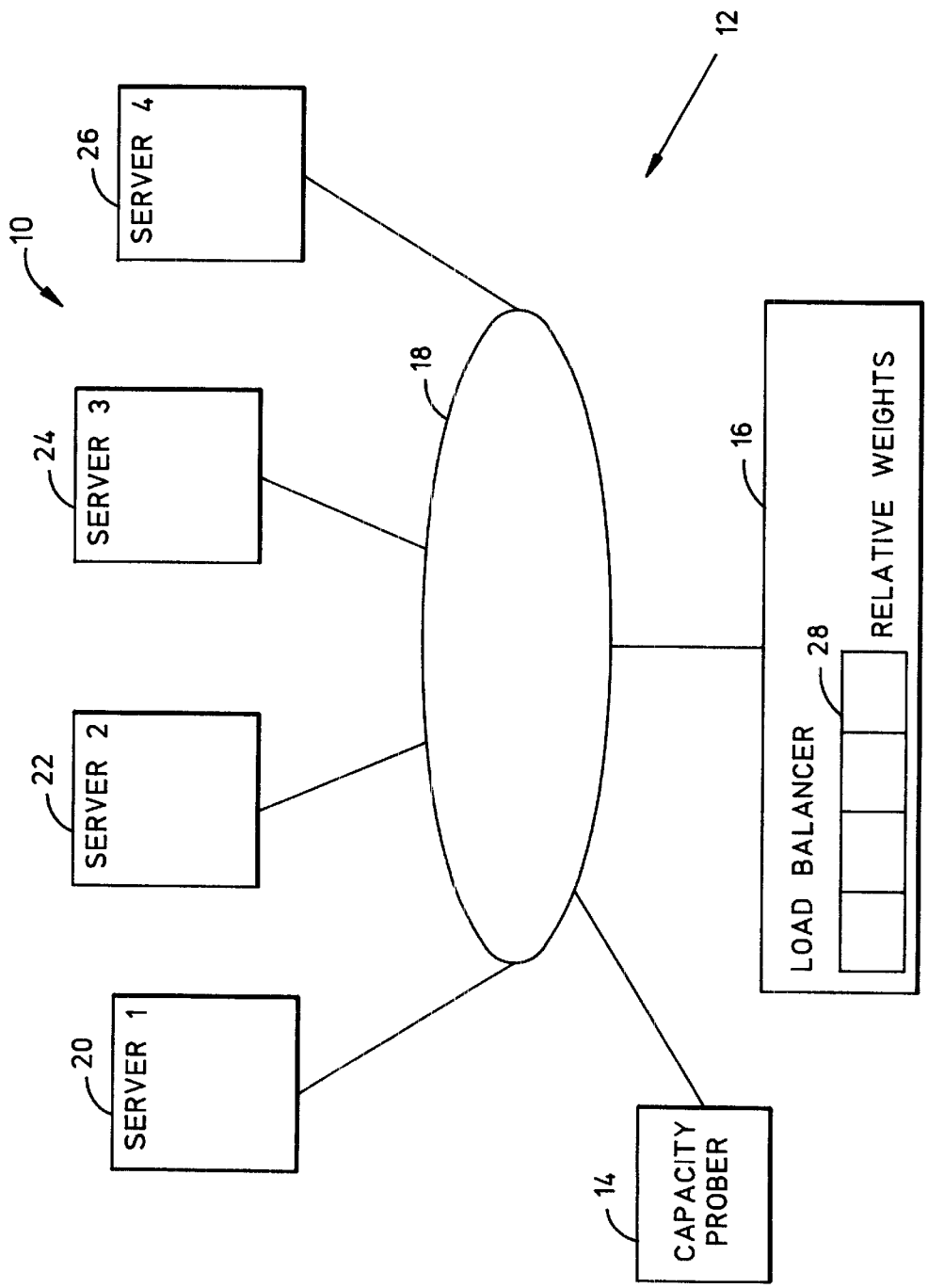
FIG. 1 is a block diagram of a system for empirically measuring the capacity of multiple servers in a cluster having a capacity prober which is centralized.

A purpose of the present invention is to provide a reliable means of fairly sharing network resources. Turning first to FIG. 1, a block diagram of a system 10 for empirically measuring the capacity of multiple servers in a cluster 12 having a capacity prober 14 which is centralized is shown. The system includes the cluster 12, the capacity prober 14, and a load balancer 16. The cluster 12 includes a network 18 and in this case four servers 20, 22, 24, 26. Four was chosen for exemplary purposes only, the cluster will contain at least two servers and may contain more as is desired and practical. The four servers can be any conventional hardware running any conventional server software. The network 18 can operate according to any of a number of conventional protocols. The load balancer 16 can be any conventional hardware and utilizes the relative weights 28 provided to it. Here, since there are four servers, there are four relative weights. Initially, the relative weights 28 will each have a value that will be referred to as weight$_{old}$. The source and actual value of the initial weights does not affect the present invention.

The capacity prober 14 may be hardware, software, or a combination of both. The capacity prober 14 may be a separate or stand alone device as shown or it may be integral to one of the four servers 20, 22, 24, 26 or to the load balancer 16. The capacity prober will access the four servers and the load balancer via the network 18 as necessary. The functions of the capacity prober will be further outlined with respect to FIG. 3 below.

Figure 2:
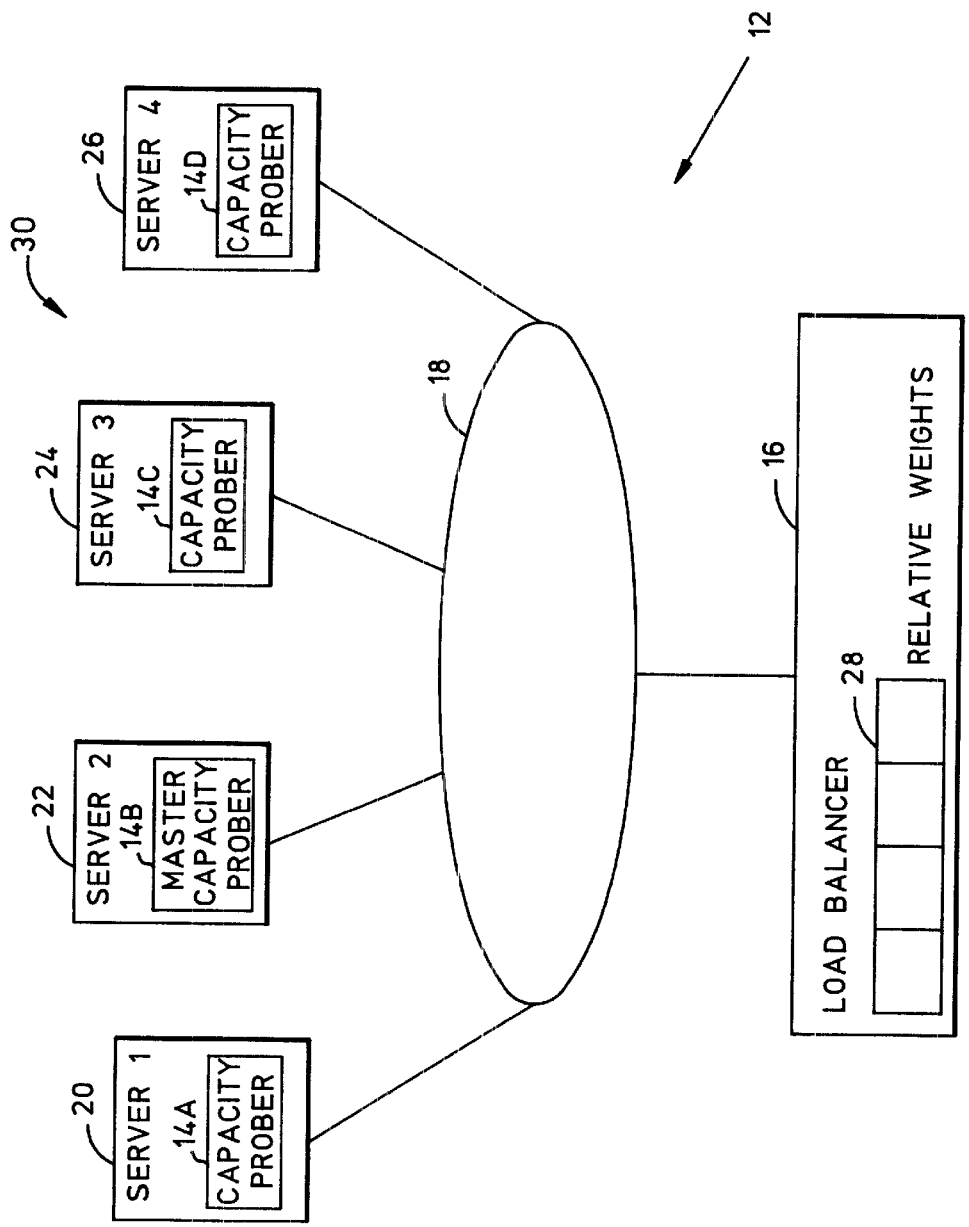
FIG. 2 is a block diagram of a system for empirically measuring the capacity of multiple servers in a cluster having a capacity prober which is distributed.

Turning now to FIG. 2, a block diagram of a system 30 for empirically measuring the capacity of multiple servers in a cluster 12 having a capacity prober which is distributed is shown. The system 30 of FIG. 2 is the same as the system 10 of FIG. 1 except that each server 20, 22, 24, 26 includes a capacity prober 14A, 14B, 14C, 14D, respectively. One of the capacity probers, in this case a master capacity prober 14B, directs and coordinates the other capacity probers 14A, 14C, 14D, respectively. In system 10 of FIG. 1, the capacity prober 14 performs a capacity test for each server over the network. This has the benefit of being easy to retrofit to an existing system through the addition of one device including the capacity prober. In system 30, the capacity probers each test their respective server only and report their results to the master capacity prober. This has the benefit, over system 10, of reducing network traffic during testing of the servers. The cost is purchasing or updating to servers which include the capacity probers. A combination of systems 10 and 30 is also possible, but coordination of the capacity probers becomes more complex. For this reason, such a combination is not presently preferred.

Figure 3:
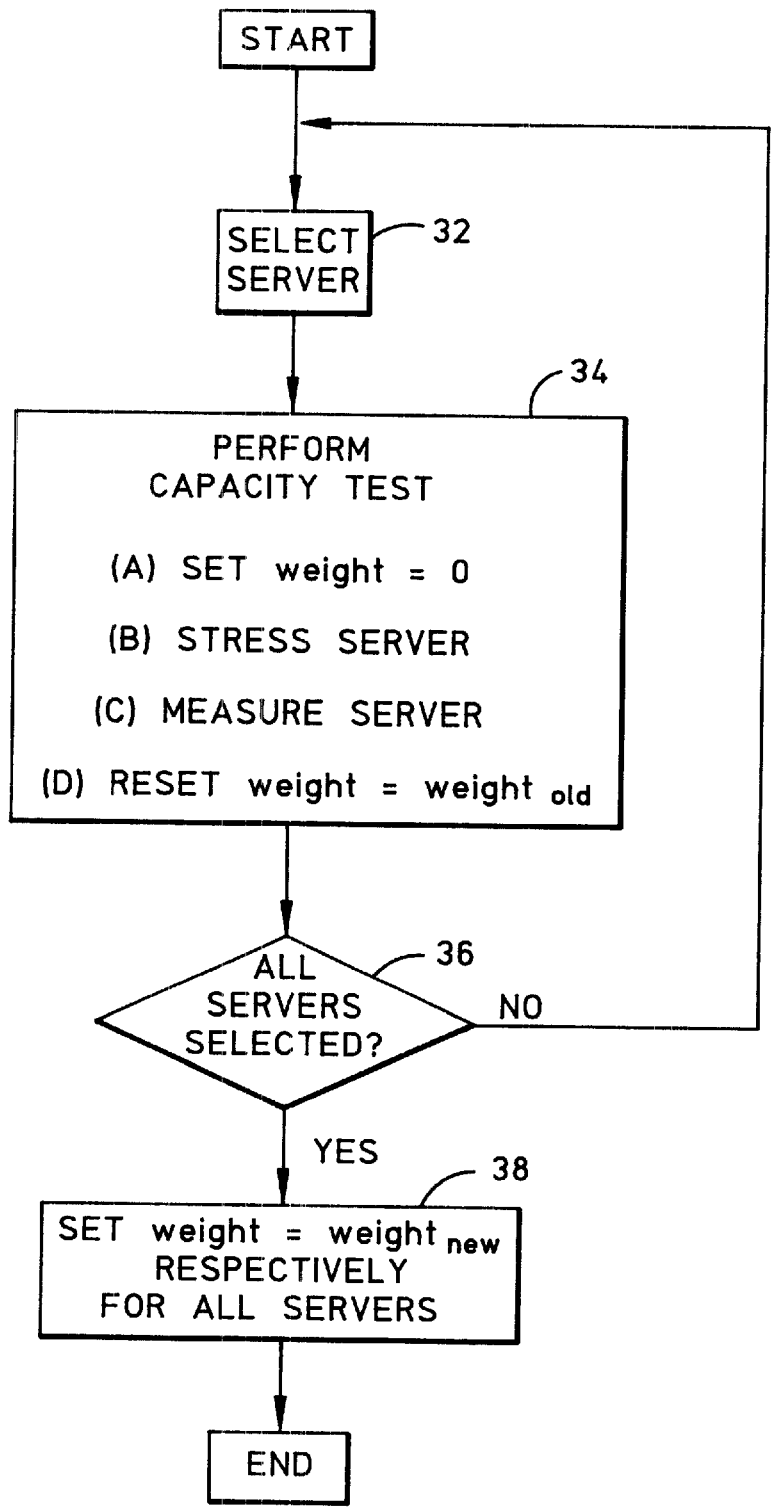
FIG. 3 is a flow diagram of the method of empirically measuring the capacity of multiple servers in a cluster according to one embodiment of the present invention.

Turning now to FIG. 3, a flow diagram of the method of empirically measuring the capacity of multiple servers in a cluster according to one embodiment of the present invention is shown. The process begins at START. At block 32, the capacity prober selects one of the servers in the cluster for capacity testing. At block 34, the capacity prober performs a capacity test on the selected server. First, the capacity prober notes the initial relative weight for the selected server, that is, weight$_{old}$, and sets the relative weight for the selected server to zero in the load balancer. This has the effect of taking the selected server out of service as far as the cluster is concerned. This is why it is necessary to run the capacity tests at off peak times to avoid serious overload of the cluster. Second, the capacity prober stresses the selected server. This can be accomplished by running any of a number of workload sets. For more concrete results, a workload set derived from the log of actual requests for an earlier time period can be used. Third, the capacity prober measures the performance of the selected server to determine the respective ability of the selected server to handle a workload. Fourth, the capacity prober sets the relative weight for the selected server back to weight$_{old}$ in the load balancer. This has the effect of putting the selected server back into service. At decision block 36, the capacity prober determines if all of the servers in the cluster have been selected. The blocks 32, 34, and 36 are repeated until all of the servers have been selected and tested. Eventually, the process proceeds to block 38 where the capacity prober sets the respective weights for all of the servers in the cluster to the new relative weight, that is, weight$_{new}$, in the load balancer. The value of weight$_{new}$ will vary with each server in the cluster and is based on the findings of the testing. The result is better load balancing which provides a reliable means of fairly sharing network resources.

As an example, apply the flow diagram of FIG. 3 to system 10 of FIG. 1. At block 32, the capacity prober 14 might select server 1 (reference numeral 20). At block 34, the capacity prober performs the capacity test on server 1. First, the capacity prober notes the initial relative weight for server 1, that is, weight1$_{old}$, and sets the relative weight for server 1 to zero in the load balancer 16. Second, the capacity prober stresses server 1. Third, the capacity prober measures the performance of server 1 to determine the respective ability of server 1 to handle a workload. Fourth, the capacity prober sets the relative weight for server 1 back to weight1$_{old}$ in the load balancer. At decision block 36, the capacity prober determines that all of the servers in the cluster have not been selected. The process then returns to block 32 where server 2 (reference numeral 22) is selected. Then blocks 32, 34, and 36 are repeated until all of the servers have been selected and tested. Eventually, the process proceeds to block 38 where the capacity prober sets the respective weights for all of the servers in the cluster to the new relative weight, that is, weight$_{new}$, in the load balancer.

As a further example, apply the flow diagram of FIG. 3 to system 30 of FIG. 2. At block 32, the master capacity prober 14B might select server 1 (reference numeral 20). At block 34, the master capacity prober 14B and capacity prober 14A perform the capacity test on server 1. First, the master capacity prober 14B notes the initial relative weight for server 1, that is, $weight1_{old}$, and sets the relative weight for server 1 to zero in the load balancer 16. Second, the capacity prober 14A stresses server 1. Third, the capacity prober 14A measures the performance of server 1 to determine the respective ability of server 1 to handle a workload and reports the findings to the master capacity prober 14B. Fourth, the master capacity prober 14B sets the relative weight for server 1 back to $weight1_{old}$ in the load balancer. At decision block 36, the master capacity prober determines that all of the servers in the cluster have not been selected. The process then returns to block 32 where server 2 (reference numeral 22) is selected. Since the master capacity prober resides in server 2, it performs the capacity test of server 2 itself. Then blocks 32, 34, and 36 are repeated until all of the servers have been selected and tested. Eventually, the process proceeds to block 38 where the master capacity prober sets the respective weights for all of the servers in the cluster to the new relative weight, that is, $weight_{new}$, in the load balancer.

It is important to note that, under either of the examples above, while one server is undergoing capacity testing, the other servers in the cluster are still available to service client requests. In this way, the entire cluster does not have to be taken down to perform the method of the present invention.

While the invention has been illustrated and described by means of specific embodiments, it is to be understood that numerous changes and modifications may be made therein without departing from the spirit and scope of the invention as defined in the appended claims and equivalents thereof.

What is claimed is:

1. An apparatus for measuring the capacity of at least one server comprising:
   a plurality of servers in a cluster;
   a network;
   a load balancer; and
   a plurality of capacity probers;
   wherein each of the plurality of capacity probers being associated with one of the plurality of servers in the cluster, and being configured to perform a capacity test on its associated server, such that during the capacity test, the associated server of the plurality of servers is rendered off-line;
   wherein the capacity test involves running a predetermined amount of workload sets on the selected server;
   wherein each of the plurality of the capacity probers communicates a predetermined parameter of the selected server to a load balancer, such that the predetermined parameter relates to the capacity test;
   wherein the predetermined parameter is set to zero, and returns the predetermined parameter back to an original value after the test is performed, thereby returning the selected server to on-line status; and
   wherein the capacity prober changes the value of the predetermined parameters for all the servers in the cluster to a new set of predetermined parameters in the load balancer, after the capacity test has been preformed on the last server in the cluster, such that the new set of predetermined parameters indicate the results of the capacity test.

2. The apparatus according to claim 1, wherein the predetermined parameters are the relative weight of the selected server.

3. The apparatus according to claim 1, wherein the workload sets are derived from actual requests over a predetermined time period.

4. A method of empirically measuring the capacity of a plurality of servers in a cluster, the method comprising the steps of:
   selecting one of the plurality of servers;
   rendering the selected server off-line;
   setting a variable parameter for the selected server to zero in a load balancer;
   stressing the selected server with a predetermined amount of workload sets;
   measuring the performance of the selected server;
   resetting the predetermined parameter for the selected server to a previous value in the load balancer; and
   rendering the selected server in service.

5. The method according to claim 4, wherein the step of stressing the selected server comprises the steps of:
   deriving the predetermined amount of workload sets from a log of actual requests; and
   running the workload sets on the selected server.

6. The method according to claim 5, wherein the step of stressing the selected server further comprises the step of:
   measuring the predetermined parameter for the selected server based the running of the workload set.

7. The method according to claim 4, wherein the step of rendering the selected server in service further comprises the step of:
   setting the measured predetermined parameter value for the selected server to a new value in the load balancer.

8. A system for empirically measuring the capacity of multiple servers in a cluster having a plurality of servers, a network and a load balancer, the method comprising the steps of:
   means for selecting one of the plurality of servers;
   means for rendering the selected server off-line;
   means for setting a variable parameter for the selected server to zero in a load balancer;
   means for stressing the selected server with a predetermined amount of work load sets;
   means for measuring the performance of the selected server;
   means for resetting the predetermined parameter for the selected server to a previous value in the load balancer; and
   means for rendering the selected server in service.

9. The method according to claim 8, wherein the means for rendering the selected server in service further comprises the step of:
   means for setting the measured predetermined parameter value for the selected server to a new value in the load balancer.

10. The method according to claim 8, wherein the means for stressing the selected server comprises the step of:
    means for deriving a workload set from a log of actual requests; and
    means for running the workload set on the selected server.

11. The method according to claim 10, wherein the means for stressing the selected server further comprises the step of:
    means for measuring the predetermined parameter for the selected server based the running of the workload set.

* * * * *